(12) United States Patent
Wallach (10) Patent No.: US 11,561,904 B2
(45) Date of Patent: *Jan. 24, 2023

(54) SECURITY CONFIGURATIONS IN PAGE TABLE ENTRIES FOR EXECUTION DOMAINS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/170,763

(22) Filed: Feb. 8, 2021

(65) Prior Publication Data

US 2021/0157741 A1    May 27, 2021

Related U.S. Application Data

(63) Continuation of application No. 16/520,296, filed on Jul. 23, 2019, now Pat. No. 10,942,863.

(Continued)

(51) Int. Cl.
*G06F 12/1009* (2016.01)
*G06F 12/14* (2006.01)
(Continued)

(52) U.S. Cl.
CPC ...... *G06F 12/1009* (2013.01); *G06F 9/45533* (2013.01); *G06F 12/1441* (2013.01); *G06F 21/53* (2013.01); *G11C 11/408* (2013.01)

(58) Field of Classification Search
CPC ............. G06F 9/45533; G06F 12/1441; G06F 21/53; G11C 11/408
See application file for complete search history.

(56) References Cited

U.S. PATENT DOCUMENTS

| 4,386,399 A | 5/1983 | Rasala et al. |
| 4,409,655 A | 10/1983 | Wallach et al. |

(Continued)

FOREIGN PATENT DOCUMENTS

| WO | 2013174503 | 11/2013 |
| WO | 2013174503 A1 | 11/2013 |

OTHER PUBLICATIONS

Lluís Vilanova et al., "CODOMs: Protecting Software with Code-centric Memory Domains," ACM SIGARCH Computer Architecture News, Jun. 2014.

(Continued)

*Primary Examiner* — Tammara R Peyton
(74) *Attorney, Agent, or Firm* — Greenberg Traurig (57) ABSTRACT

Systems, apparatuses, and methods related to a computer system having a page table entry containing security settings for calls from predefined domains are described. The page table entry can be used to map a virtual memory address to a physical memory address. In response to a call to execute a routine identified using the virtual memory address, a security setting corresponding to the execution domain from which the call initiates can be extracted from the page table entry to determine whether a security measure is to be used. For example, a shadow stack structure can be used to protect the private stack content of the routine from being access by a caller and/or to protect the private stack content of the caller from being access by the callee.

20 Claims, 5 Drawing Sheets

Related U.S. Application Data (60) Provisional application No. 62/724,913, filed on Aug. 30, 2018.

(51) Int. Cl.
*G06F 9/455* (2018.01)
*G06F 21/53* (2013.01)
*G11C 11/408* (2006.01)

(56) References Cited

U.S. PATENT DOCUMENTS

| | | |
|---|---|---|
| 4,525,780 A | 6/1985 | Bratt et al. |
| 4,821,184 A | 4/1989 | Clancy et al. |
| 5,280,614 A | 1/1994 | Munroe et al. |
| 6,393,544 B1 | 5/2002 | Bryg et al. |
| 6,446,188 B1 | 9/2002 | Henderson et al. |
| 7,370,193 B2 | 5/2008 | Shao et al. |
| 8,245,270 B2 | 8/2012 | Cooperstein et al. |
| 8,607,299 B2 | 12/2013 | Baker |
| 8,713,563 B2 | 4/2014 | Kondoh et al. |
| 9,405,515 B1 | 8/2016 | Bertram et al. |
| 9,519,779 B2 | 12/2016 | Ghosh et al. |
| 9,575,784 B1 | 2/2017 | Aron et al. |
| 9,852,084 B1 | 12/2017 | Soderquist et al. |
| 10,043,001 B2 | 8/2018 | Ghosh et al. |
| 10,757,100 B2 | 8/2020 | Angelino et al. |
| 10,915,457 B2 | 2/2021 | Wallach |
| 10,915,465 B2 | 2/2021 | Wallach |
| 10,942,863 B2 | 3/2021 | Wallach |
| 10,984,097 B2 * | 4/2021 | Ghosh ............... G06F 21/566 |
| 11,182,507 B2 | 11/2021 | Wallach |
| 2002/0184345 A1 | 12/2002 | Masuyama et al. |
| 2004/0078631 A1 | 4/2004 | Rogers et al. |
| 2004/0133777 A1 | 7/2004 | Kiriansky et al. |
| 2004/0221036 A1 | 11/2004 | Smith |
| 2005/0257243 A1 | 11/2005 | Baker |
| 2008/0086729 A1 | 4/2008 | Kondoh et al. |
| 2008/0091891 A1 | 4/2008 | Shiota et al. |
| 2008/0104586 A1 | 5/2008 | Thorton et al. |
| 2008/0162680 A1 | 7/2008 | Zimmer et al. |
| 2008/0244206 A1 | 10/2008 | Heo et al. |
| 2008/0250216 A1 | 10/2008 | Kershaw et al. |
| 2008/0250217 A1 | 10/2008 | Kershaw et al. |
| 2008/0276051 A1 | 11/2008 | Renno |
| 2009/0259846 A1 | 10/2009 | Watt et al. |
| 2010/0228936 A1 | 9/2010 | Wright et al. |
| 2010/0228943 A1 | 9/2010 | Deshpande et al. |
| 2010/0235598 A1 | 9/2010 | Bouvier |
| 2011/0055528 A1 | 3/2011 | Kondoh et al. |
| 2012/0036334 A1 | 2/2012 | Horman et al. |
| 2012/0042144 A1 | 2/2012 | Grisenthwaite |
| 2013/0132690 A1 | 5/2013 | Epstein |
| 2013/0132695 A1 | 5/2013 | Heo et al. |
| 2013/0151831 A1 | 6/2013 | Bealkowski et al. |
| 2014/0173169 A1 | 6/2014 | Liu et al. |
| 2014/0331019 A1 | 11/2014 | Parker et al. |
| 2015/0100717 A1 | 4/2015 | Bennett et al. |
| 2015/0128249 A1 | 5/2015 | Alexandrian et al. |
| 2015/0180894 A1 | 6/2015 | Sadovsky et al. |
| 2015/0301850 A1 | 10/2015 | Jeong et al. |
| 2016/0110298 A1 | 4/2016 | Koufaty et al. |
| 2016/0210082 A1 | 7/2016 | Frank et al. |
| 2016/0350019 A1 | 12/2016 | Koufaty et al. |
| 2016/0381050 A1 | 12/2016 | Shanbhogue et al. |
| 2017/0060783 A1 | 3/2017 | Chiu et al. |
| 2017/0367036 A1 | 12/2017 | Chen et al. |
| 2018/0048648 A1 | 2/2018 | Angelino et al. |
| 2018/0060244 A1 | 3/2018 | Godard et al. |
| 2018/0095902 A1 | 4/2018 | Lemay et al. |
| 2018/0121665 A1 | 5/2018 | Anderson et al. |
| 2019/0102537 A1 | 4/2019 | Zhang et al. |
| 2019/0196983 A1 | 6/2019 | Khosravi et al. |
| 2020/0073693 A1 | 3/2020 | Wallach |
| 2020/0073694 A1 | 3/2020 | Wallach |
| 2020/0073820 A1 | 3/2020 | Wallach |
| 2020/0073821 A1 | 3/2020 | Wallach |
| 2020/0073822 A1 | 3/2020 | Wallach |
| 2020/0073827 A1 | 3/2020 | Wallach |
| 2020/0074093 A1 | 3/2020 | Wallach |
| 2020/0074094 A1 | 3/2020 | Wallach |
| 2021/0141742 A1 | 5/2021 | Wallach |
| 2021/0149817 A1 | 5/2021 | Wallach |
| 2021/0240619 A1 | 8/2021 | Earnshaw |
| 2022/0050908 A1 | 2/2022 | Wallach |

OTHER PUBLICATIONS

Extended European Search Report, EP19856112.8, dated Apr. 14, 2022.
Extended European Search Report, EP19855925.4, dated Apr. 11, 2022.
Extended European Search Report, EP19854049.4, dated Apr. 7, 2022.
Extended European Search Report, EP19853813.4, dated Apr. 4, 2022.
Extended European Search Report, EP19855829.8, dated Apr. 11, 2022.
Extended European Search Report, EP19854485.7, dated Apr. 11, 2022.
Extended European Search Report, EP19854059.3, dated Apr. 11, 2022.
Extended European Search Report, EP19854058.5, dated Apr. 20, 2022.
Fernandez, Eduardo B., et al. "Patterns for the secure and reliable execution of processes." Pattern Languages of Programs, ACM, Oct. 18, 2008.
Martinsen, Jayce. "Implementation of Intel Virtual Machine Extension Root Operation on the NPS Least Privilege Separation Kernel." Naval Postgraduate School thesis, Sep. 2010.
Vilanova, Lluis, et al. "CODOMs: Protecting Software with Code-centric Memory Domains." IEEE, Jun. 14, 2014.
Vilanova, Lluis. "CODOMs: Protecting Software with Code-centric Memory Domains." IEEE, 2014.
Vmware. "Mechanisms to determine if software is running in a Vmware virtual machine." Retrieved from the Internet <https://kb.vmware.com/s/article/1009458> on Nov. 23, 2021.
"Hash table. Collision resolution by chaining (closed addressing)", Algorithms and Data Strcutures: with implementations in Java and C++, http://www.algolist.net/Data_structures/Hash_table/Chaining, printed on Aug. 30, 2018.
Call stack, Wikipedia, printed on Aug. 10, 2018.
Capability-based addressing, Wikipedia, printed on Sep. 13, 2018.
Explain Hashed page tables in operating system, https://cs.stackexchange.com/questions/85207/explain-hashed-page-tables-in-operating-system, printed on Aug. 17, 2018.
G. J. Myers, B. R. S. Buckingham, "A Hardware Implemenation of Capability-based Addressing", ACM SIGARCH Computer Architecture News Homepage archive, vol. 8, Iss. 6, Oct. 1980.
George Radin, Peter R. Schneider, "An Architecture for an Extended Machine With Protected Addressing", May 21, 1976.
Hash table, Wikipedia, printed on Aug. 30, 2018.
Hypervisor, Wikipedia, printed on Apr. 19, 2018.
International Search Report and Written Opinion, PCT/US2019/048015, dated Dec. 12, 2019.
International Search Report and Written Opinion, PCT/US2019/048006, dated Dec. 11, 2019.
International Search Report and Written Opinion, PCT/US2019/048008, dated Dec. 12, 2019.
International Search Report and Written Opinion, PCT/US2019/048023, dated Dec. 17, 2019.
International Search Report and Written Opinion, PCT/US2019/048020, dated Dec. 17, 2019.
International Search Report and Written Opinion, PCT/US2019/048019, dated Dec. 17, 2019.
International Search Report and Written Opinion, PCT/US2019/048013, dated Dec. 13, 2019.
International Search Report and Written Opinion, PCT/US2019/048018, dated Dec. 17, 2019.

(56) References Cited

OTHER PUBLICATIONS

Michael D. Schroeder, Jerome H. Saltzer, "A Hardware Architecture for Implementing Protection Rings", Presented at the Third ACM Symposium on Operating Systems Principles, Palo Alto, CA, Oct. 1971.
Page replacement algorithm, Wikipedia, printed on Jul. 31, 2018.
Page table, Wikipedia, printed on Jul. 31, 2018.
Protection ring, Wikipedia, printed on Jul. 31, 2018.
R. S. Fabry, "Capability-Based Addressing", Communications of the ACM, Jul. 1974.
Sandbox (computer security), Wikipedia, printed on Aug. 21, 2018.
Stack register, Wikipedia, printed on Aug. 10, 2018.
The RISC-V Instruction Set Manual, Volume II: Privileged Architecture, May 7, 2017.
Title: Security Configuration for Memory Address Translation from Object Specific Virtual Address Spaces to a Physical Address Space U.S. Appl. No. 16/520,311, filed Jul. 23, 2019 Inventor: Steven Wallach Status: Response to Non-Final Office Action Entered and Forwarded to Examiner dated Jan. 21, 2021.
Title: Access Control for Processor Registers based on Execution Domains U.S. Appl. No. 16/520,290, filed Jul. 23, 2019 Inventor: Steven Wallach Status: Docketed New Case—Ready for Examination Status Date: Aug. 23, 2019.
Title: Memory Configured to Store Predefined Set of Domain Registers for Instructions Being Executed in Computer Processors U.S. Appl. No. 16/520,298, filed Jul. 23, 2019 Inventor: Steven Wallach Status: Notice of Allowance Mailed—Application Received in Office of Publications dated Oct. 6, 2020.
Title: Domain Register for Instructions Being Executed in Computer Processors U.S. Appl. No. 17/154,722, filed Jan. 21, 2021 Inventor: Steven Wallach Status: Application Undergoing Preexam Processing Status Date: Jan. 21, 2021.
Title: Domain Crossing in Executing Instructions in Computer Processors U.S. Appl. No. 16/520,299, filed Jul. 23, 2019 Inventor: Steven Wallach Status: Docketed New Case—Ready for Examination Status Date: Aug. 23, 2019.
Title: Dynamic Configuration of a Computer Processor based on the Presence of a Hypervisor U.S. Appl. No. 16/520,304, filed Jul. 23, 2019 Inventor: Steven Wallach Status: Docketed New Case—Ready for Examination Status Date: Jan. 2, 2020.
Title: Virtual Machine Register in a Computer Processor U.S. Appl. No. 16/520,310, filed Jul. 23, 2019 Inventor: Steven Wallach Status: Docketed New Case—Ready for Examination Status Date: Sep. 24, 2019.
Title: Memory Access Control through Permissions Specified in Page Table Entries for Execution Domains U.S. Appl. No. 16/520,292, filed Jul. 23, 2019 Inventor: Steven Wallach Status: Patented Case Status Date: Jan. 20, 2021.
Title: Memory Access Control through Permissions Specified in Page Table Entries for Execution Domains U.S. Appl. No. 17/158,979, filed Jan. 26, 2021 Inventor: Steven Wallach Status: Application Undergoing Preexam Processing Status Date: Jan. 26, 2021.
Title: Security Configurations in Page Table Entires for Execution Domains Using a Sandbox Application Operation U.S. Appl. No. 16/520,296, filed Jul. 23, 2019 Inventor: Steven Wallach Status: Publications—Issue Fee Payment Verified Status Date: Jan. 22, 2021.
Lluis Vilanova, et al. "CODOMs: Protecting Software with Code-centric Memory Domains." ACM SIGARCH Computer Architecture News, vol. 42, Issue 3, Jun. 2014.

* cited by examiner

SECURITY CONFIGURATIONS IN PAGE TABLE ENTRIES FOR EXECUTION DOMAINS

RELATED APPLICATIONS

The present application is a continuation application of U.S. patent application Ser. No. 16/520,296, filed Jul. 23, 2019 and entitled "Security Configurations in Page Table Entries for Execution Domains," which claims the benefit of the filing date of Prov. U.S. Pat. App. Ser. No. 62/724,913, filed Aug. 30, 2018 and entitled "Security Configurations in Page Table Entries for Execution Domains," the entire disclosures of which applications are hereby incorporated herein by reference.

TECHNICAL FIELD

At least some embodiments disclosed herein relate generally to computer architecture and more specifically, but not limited to, security control implemented through configurations specified in page table entries for execution domains.

BACKGROUND

Instructions programmed for a computer can be structured in layers. One layer can provide resources and services for another layer. For example, a hypervisor can create or provision virtual machines that are implemented on the hardware components of the computer. An operating system can offer resources and services using resources available in a computer having predefined architecture. The computer resources or computer operated upon by the operating system can be actual computer hardware components, or virtual machine components provisioned by a hypervisor. An application can provide application specific functions using the services and resources provided by an operating system.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of selectively apply security measures to protect the content of a called routine and the content of a calling routine from each other based on non-hierarchical domains of executions from which the call from the calling routine to the called routine is made and based on settings specified in page table entries. For example, when routine A calls routine B, the security measures can be selectively deployed to protect the data and code of routine A from routine B and/or protect the data and code of routine B from routine A. For example, routine B could be a library routine that performs numerical calculations. When routine B is part of the address space of routine A, it potentially can access the data of routine A. To prevent routine B from functioning as a trojan horse routine, sandboxing operations can be performed to limit the data that routine B can access in the address space of routine A, even when routine A and routine B use the same logical to physical translation tables.

In a traditional system, different layers of instructions (e.g., user applications vs. operating system) may be given different levels of privilege and/or trust. Conventionally, protection rings have been constructed and implemented in computers to protect data and functionality from fault and malicious behaviors based on a hierarchy of rings. Rings are statically arranged in the hierarchy from most privileged (and thus most trusted) to least privileged (and thus least trusted). For example, the hierarchy can include a ring of operating system kernel that is the most privileged, a ring of device drivers, and a ring of applications that are the least privileged. A program or routine in a lower privilege ring can be limited by a respective special hardware enforced control gate to access the resources and services of a higher privilege ring in the hierarchy. Gating access between rings can improve security.

In the techniques of the present disclosure, instructions or routines programmed for a computer system can be classified into a set of predefined, non-hierarchical, domains, such as a domain of hypervisor, a domain of operating system, a domain of application, etc. One routine can call another routine stored in memory identified via a virtual memory address. The virtual memory address is translated to physical memory address using one or more page tables. A physical memory region storing the called routine can be explicitly configured via a page table entry to conditionally invoke a security measure (e.g., a shadow stack) to protect its content (e.g., private data pushed on to the call stack) against access by the calling routine and/or to protect the content of the calling routine against access by the called routine. The security measures can be selectively deployed in accordance with the execution domain of the calling routine and a respective setting in the page table entry, without relying upon a static domain hierarchy. Routines of different domains and/or stored in different memory regions can have different security measures for sandboxing calls from different domains. Thus, sandboxing is not restricted to a particular domain.

Figure 1:
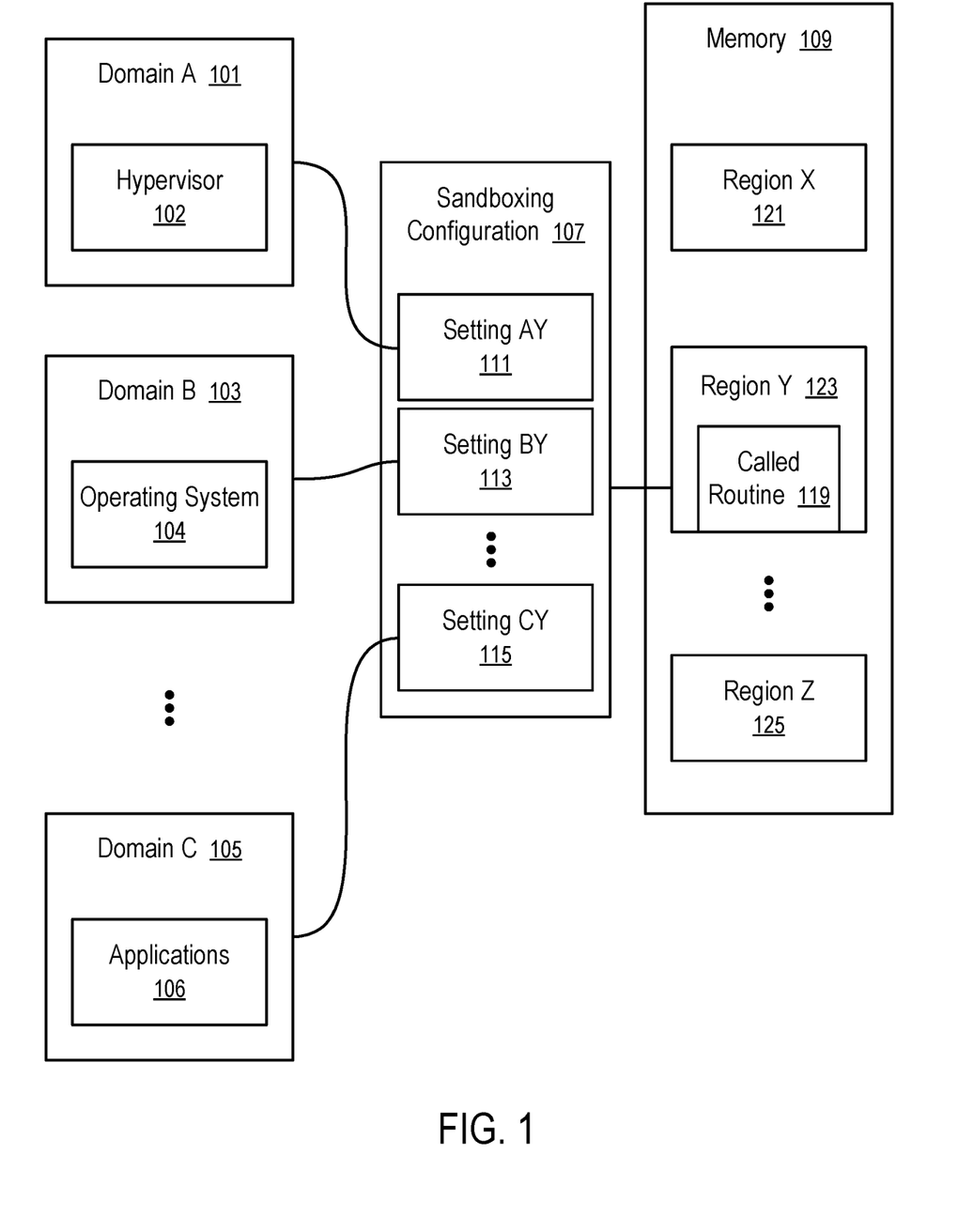
FIG. 1 shows a system to control sandboxing according to some embodiments.

FIG. 1 shows a system to control sandboxing according to some embodiments. Sandboxing in general includes a computer measure that isolates the execution of a set of instructions (e.g., an application) from certain system resources and/or other sets of instructions/programs.

The system of FIG. 1 includes physical memory (109) that can be used to store data and instructions for various routines programmed for a computer system.

In general, a routine can include a pre-programmed set of instructions stored in the memory (109). The routine can also have input data, output data, and/or, temporary data stored in the memory (109). A routine can invoke or call another routine (e.g., 119) for services and/or resources. The calling routine and the called routine can be in a same domain or different domains (e.g., 101, 103, . . . , 105). Different regions (121, 123, . . . , 125) in the memory (109) can be configured with different sandboxing configurations (e.g., 107) to control the selective deployment of security measures for sandboxing; and each sandboxing configuration (107) for a region (123) can include different settings (111, 113, ..., 115) for respective domains (101, 103, ..., 105) that invoke calls to called routines (e.g., 119) stored in the region (123). The sandboxing configurations (e.g., 107) can be specified, for example, in a page table entry used in logical to physical address translation of virtual memory addresses, such that the structure of the memory regions (121, 123, ..., 125) can correspond to the memory page structure, as further discussed below in connection with FIG. 3.

In FIG. 1, the physical memory (109) is divided into multiple regions (121, 123, ..., 125). For example, each region (e.g., 123) can be a page of physical memory (109) for memory management, or a set of pages of physical memory (109).

A typical region Y (e.g., 123) can have a respective set (107) of sandboxing configuration specified for the set of predefined domains (101, 103, ..., 105). For example, routines of a hypervisor (102) can be classified in a domain A (101); routines of an operating system (104) can be classified in another domain B (103); and routines of applications (106) can be classified in a further domain C (105). A hypervisor or virtual machine monitor (VMM) creates and manages virtual machines. The hypervisor can control basic functions such as physical memory and input/output (I/O). The sandboxing configuration (107) explicitly identifies whether or not a sandboxing operating is required for a call to execution a routine (e.g., 119) stored in the region (123), such as when a routine executed in a domain (101, 103, ..., or 105) calls the routine (119) stored in the region (123). Calls to execute the same routine (119) from routines executed in the different domains (101, 103, ..., 105) can have different settings (111, 113, ..., 115) respectively; and the settings (111, 113, ..., 115) specify whether the calls from the respectively domains (101, 103, ..., 105) require sandboxing (e.g., to protect the called routine (119) and the calling routine from each other). Thus, the sandboxing operations can be selectively applied for the execution of the called routine (119) stored in the memory region (123), based on explicit settings (e.g., 111, 113, ..., 115) configured for the respective domains (101, 103, ..., 105) from which the calls are made, without relying upon a predefined hierarchy of domains (102, 103, ..., 105).

For example, a routine (119) in the domain (103) can be programmed for an operating system (104) and configured be stored in the memory region Y (123). When another routine in the domain (101) for a hypervisor (102) calls the routine (119) stored in the memory region (123), the sandbox setting (111) specified for the region (123) for calls from the domain (101) is checked. Whether or not to invoke a sandboxing operation for the call to the routine (119) stored in the memory region (123) can be determined based on the sandbox setting (111) that is specified for the domain (101) and for the memory region (123). Thus, the sandboxing operation can be invoked independent of a relative hierarchy between the called domain (103) of the routine (119) and the calling domain (101).

Similarly, consider a routine (119) in the domain (103) that is programmed for an operating system (104) and stored in the memory region Y (123). When another routine in the domain (105) for an application (106) calls the routine (119) stored in the memory region (123) for execution, the sandbox setting (115) specified for the domain (105) to call the region (123) is checked. Whether or not to deploy a sandboxing operation for the call from an application (106) in the domain (103), to execute the routine (119) stored in the memory region (123), can be determined based on the sandbox setting (115) specified for the domain (105) and for the memory region (123). Thus, the sandboxing operation can be invoked independent of a relative hierarchy between the calling and called domains (e.g., 105 and 103).

In general, different routines of a same domain (e.g., 103) can be stored in different regions (e.g., 121, 123, ..., 125) and thus configured to have different sandboxing requirements for calls from a same domain (e.g., 101, 103, or 105).

In general, a region (e.g., 123) can store multiple routines (e.g., 119) that share the same sandboxing configuration (107).

Since the sandboxing configurations of FIG. 1 does not rely upon a predefined domain hierarchy of trust (i.e., non-hierarchical), it can provide better flexibility and finer control than the conventional statically defined, hierarchical protection rings.

Figure 2:
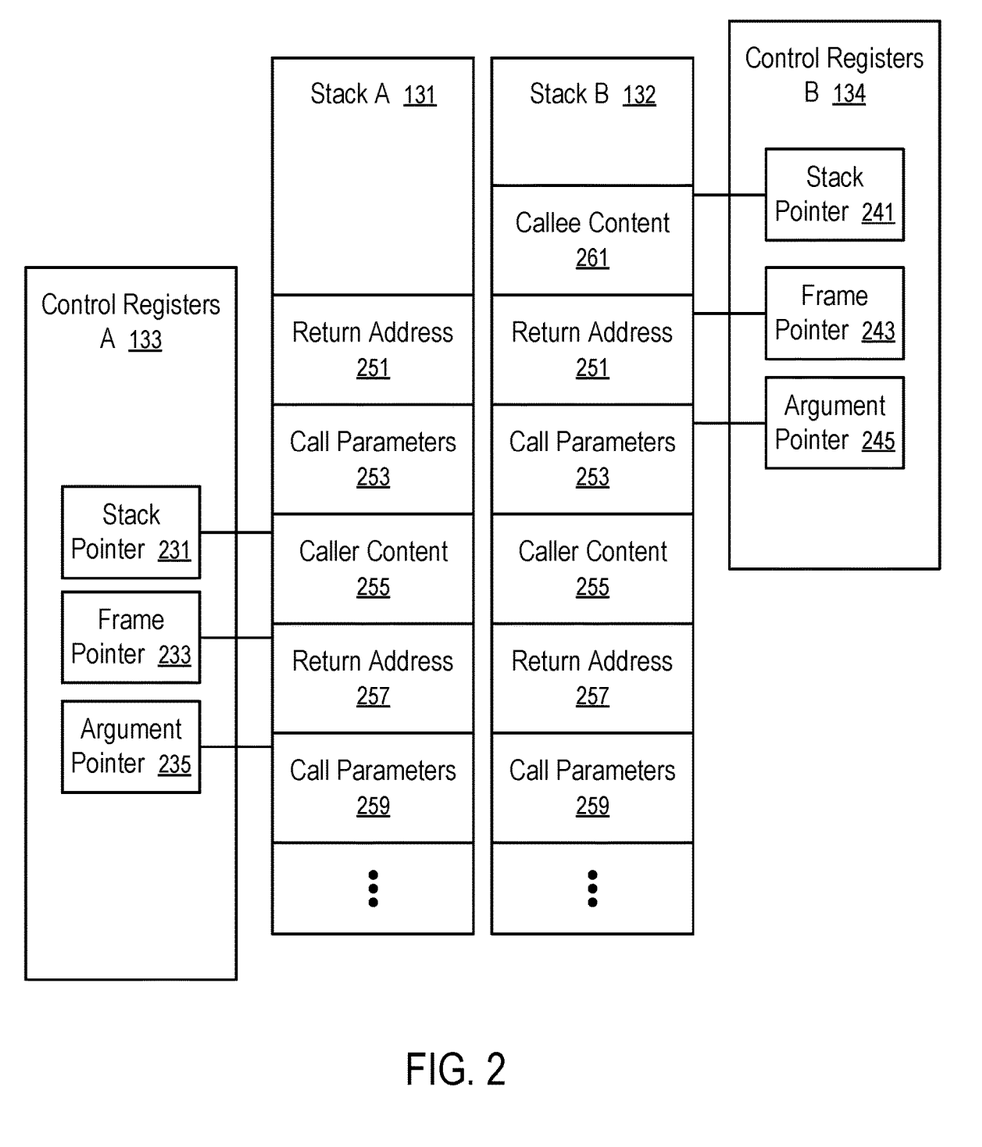
FIG. 2 shows a shadow stack structure for sandboxing in the system of FIG.

FIG. 2 shows a shadow stack structure for sandboxing in the system of FIG. 1.

In FIG. 2, a calling routine (caller) and a called routine (callee) can be configured to use separate call stacks (131 and 132) for sandboxing.

For example, a caller is configured to use a call stack A (131) in connection with a set (133) of control registers, such as a stack pointer (231), a frame pointer (233), an argument pointer (235). In general, the caller itself can be called by a further routine. Thus, the frame pointer (233) identifies the location of the return address (257) of the caller when the caller returns. The argument pointer (235) identifies the location of the arguments/parameters used by the further routine to invoke the caller.

In general, the caller can push its private content (255) to the stack A (131) during its execution and pop the content (255) off the stack A (131) during its execution. For example, the caller content (255) can be pushed onto the stack (131) before the call to execute the callee; and the caller content (255) can be popped off the stack A (131) after the execution of the callee returns. The stack pointer (231) identifies the top of the stack A (131) as used by the caller.

Before the callee is loaded for execution, the caller can push call parameters (253) for the callee; and a return address (251) can also be pushed onto the stack A (131).

When a sandboxing operation is performed to protect the content of the caller from the callee and/or to protect the content of the callee from the caller, a portion of the content of the stack A (131) is replicated into a separate stack B (132), including the return address (251) and the call parameters (253). The separate stack B (132) can be considered a shadow of the stack A (131). The shadow stack B (132) can be used in the execution of the callee.

Preferably, a separate set (134) of control registers is used in the operations of the stack B (132). For example, a separate stack pointer (241), a separate frame pointer (243), and a separate argument pointer (245) can be used in the execution of the callee using the stack (132).

During the execution of the callee, the instructions of the callee can push its private content (261) to the stack B (132) and pup off items from the stack B (132) when needed. The callee can be limited to use the stack B (132) and be prevented from accessing the separate stack A (131) for the caller. Thus, the callee can be physically prevented from accessing the private content (255) of the caller.

Similarly, the caller can be limited to use the stack A (131) and be prevented from accessing the separate stack B (132) for the callee (e.g., via allocating slots on the stack without pushing data on the stack first). Thus, the caller is physically prevented from accessing the private content (261) of the callee.

Once the callee returns (e.g., using the return address (251) identified by the separate frame pointer (243)), the caller can continue its operation using the stack A (131) and its associated set (133) of control registers.

Optionally, the content in the stack B (132) can be erased upon the callee returns, and/or when the stack B (132) is used during the initiation of a call.

When the shadow stack structure of FIG. 2 is used, the data security of the callee is improved; and the caller is prevented from accessing the stack data of the callee.

Optionally, the stack B (132) is not provided with the data of the caller (and its caller(s)). For example, when the stack B (132) is configured for the operation of the callee, the return address (251) and the call parameters (253) can be replicated from the stack A (131) to the stack B (132); and the other data under the call parameters (253), including the caller content (255), is not replicated from the stack A (131) to the stack B (132). Thus, the callee is physically prevented from accessing the private content (255) of the caller and/or other call stack data.

Whether or not a callee stored in a memory region (123) requires the use of the separate stack (132) can be configured using a sandboxing configuration (107). The sandboxing configuration (107) can have different settings (111, 113, ..., 115) for callers from different domains (101, 103, ..., 105).

Figure 3:
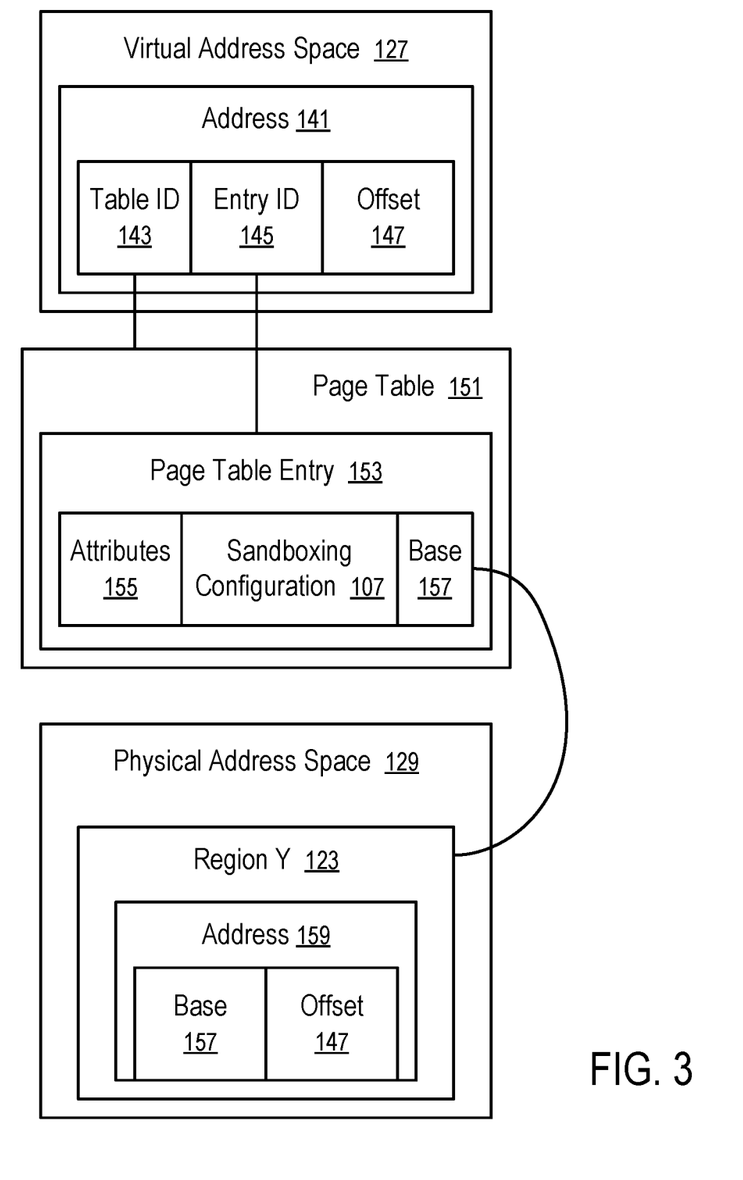
FIG. 3 illustrates a page table entry having a sandboxing configuration for execution domains.

The sandboxing configuration (107) can be stored as part of a page table entry of the region (123), as illustrated in FIG. 3

FIG. 3 illustrates a page table entry (153) having a sandboxing configuration (107) for execution domains (e.g., 101, 103, ..., 105).

A typical virtual address (141) in a virtual address space (127) can be translated into a corresponding physical address (159) in a physical address space (129) using a page table (151). In general, multiple page tables (e.g., 151) can be used to map the virtual address space (127) to the physical address space (129).

The virtual address (141) can include a table ID (143), an entry ID (145), and an offset (147). The table ID (143) can be used to identify a page table (151) that contains a page table entry (153) for a page that contains the memory unit that is identified by the virtual address (141) and the physical address (159). The entry ID (145) is used as an index into the page table (151) to locate the page table entry (153) efficiently. The page table entry (153) provides a base (157) of the physical address (159). Physical addresses in the same page of memory share the same base (157). Thus, the base (157) identifies the region (123) in the memory (109). The offset (147) of the virtual address (141) is used as a corresponding offset (147) in the page or region (123) in the memory (109). The combination of the base (157) and the offset (147) provides the physical address (159) corresponding to the virtual address (141).

In FIG. 3, the page table entry (153) specifies not only the base (157) for the page or region (123), but also the sandboxing configuration (107) for the page or memory region (123), including settings (111, 113, ..., 115) for the respective domains (101, 103, ..., 105) illustrated in FIG. 1.

For example, the sandboxing configuration (107) can include a set of bits (111, 113, ..., 115) for the set of domains (101, 103, ..., 105) respectively. When a sandbox setting bit (e.g., 111, 113, ..., or 115) is set to have a first value (e.g., 1 or 0), a call from a corresponding domain (e.g., 101, 103, ..., 105) to a routine stored in the region (123) is required to use the shadow stack structure of FIG. 2 to protect the callee content (261) from being accessed by the caller and/or to protect the caller content (255) from being accessed by the callee. When a sandbox setting bit (e.g., 111, 113, ..., or 115) is set to have a second value (e.g., 0 or 1), a call from a corresponding domain (e.g., 101, 103, ..., 105) to a routine stored in the region (123) does not use the shadow stack structure of FIG. 2 to protect the caller and callee from each other; and the caller and callee can share a same set of control registers (133) and the same stack (131).

Optionally, the page table entry (153) can specify other attributes (155) of the page of physical memory, such as whether the data in the page is valid, whether the page is in main memory, whether the page is dirty (e.g., the changes in data in the page of physical memory have not yet been flushed to a longer-term memory/storage device relative to the memory region (123)).

Further, the page table entry (153) can optionally include permission settings for the domains (101, 103, ..., 105) to access the memory region (123) for various operations, such as read, write, execution, etc. For example, for each domain (101, 103, ..., or 105), a permission bit in the page table entry (153) can specify whether a routine running in the domain (101, 103, ..., or 105) can access the memory region (123) defined by the base (157) for a particular type of operation, such as read, write, or execution. For example, the attributes (155) can include a page fault bit indicating whether the page is in the main memory of the computer or in a storage device of the computer. If the permission setting allow the current access to the page of memory and the page fault bit indicate that the page is currently not in the main memory of the computer, the memory management unit (181) can swap the page from the storage device into the main memory of the computer to facilitate the access to the page identified by the page table entry (153). However, if the permission settings deny the current access to the page for the current execution domain, it is not necessary to evaluate the page fault bit and/or to swap in the page corresponding to the page table entry (153).

In general, the table ID (143) can be divided into multiple fields used to locate the page table (151). For example, the table ID (143) can include a top table ID identifying a top-level page table and a top table entry ID that is used as an index into the top-level page table to retrieve a page table entry containing an identifier of the page table (151), in a way similar to the entry ID (145) indexing into the page table (151) to identify the page table entry (153) containing the base (157).

In general, an entry ID (145) can be considered a virtual page number in the page table (151); and the virtual page number (e.g., 145) can be used in the page table (151) to look up the page table entry (153) containing the base (157).

For example, the table ID (143) can include a set of virtual page numbers that can be used to identify a chain of page tables (e.g., 151). Each virtual page number is used as an index in a page table (or page directory) to identify the page table entry (or page directory entry) that contains the identity or base of the next level page table (or page directory).

In some instances, different running processes in a computer can have different virtual address spaces (e.g., 127); and the process ID of a running process can be used in determine the top-level page table (or page directory). In some instances, a hash of a portion of the virtual address (141), the process ID, and/or an identification of a virtual machine hosted in the computer system can be used to locate the top-level page table (or page directory). In some instances, a hash is used as an index or key to look up a page table entry. Regardless of how the page table entry (153) is located (e.g., via indexing through multiple page tables, via the use of a hash as an index or key), the content of the page table entry (153) can be configured in a way as illustrated in FIG. 3 to provide the sandboxing configure (107) for different domains (101, 103, ..., 105) to selectively deploy security measures for calling a routine stored in the page/memory region (123) corresponding to the base (157).

In FIG. 3, the sandboxing configuration (107) for a page or region Y (123) is specified in the bottom-level page table (151), where the page table entry (153) in the bottom-level page table (151) provides the base (157) of the physical address (159).

Alternatively, or in combination, higher-level page tables (or page directories) can also have sandboxing configurations for their page table entries (or page directory entries). For example, a page table entry (or page directory entry) identifying the page table (151) can have a sandboxing configuration for all of the pages in the page table (151); and thus, the domain permission data in the page table entry is applicable to the memory region defined by the page table (151). The hierarchy of sandboxing configurations specified in the chain of page table entries leading to the page table (151) and the sandboxing configuration (107) in the bottom-level page table entry (153) can be combined via a logic AND operation or a logic OR operation.

For example, a call to a called routine (119) from a routine running in a domain (e.g., 101, 103, ..., 105) can require a sandboxing operation (e.g., using the shadow stack structure of FIG. 2) if all of the sandboxing configurations in the chain of page table entries leading to the base (157), including the bottom-level table entry (153), have the value that requires sandboxing. Alternatively, sandboxing can be required if any of the sandboxing configurations in the chain of page table entries leading to the base (157), including the bottom-level table entry (153), have the value that requires sandboxing. Alternatively, sandboxing is not implemented if none of the sandboxing configurations in the chain of page table entries leading to the base (157), including the bottom-level table entry (153), have the value that requires sandboxing. Alternatively, sandboxing is not implemented if any of the sandboxing configurations in the chain of page table entries leading to the base (157), including the bottom-level table entry (153), has the value that does not require sandboxing.

Optionally, the sandboxing configuration (e.g., 107) is specified in the bottom-level page table (151) but not in the higher-level page tables (directories).

Figure 4:
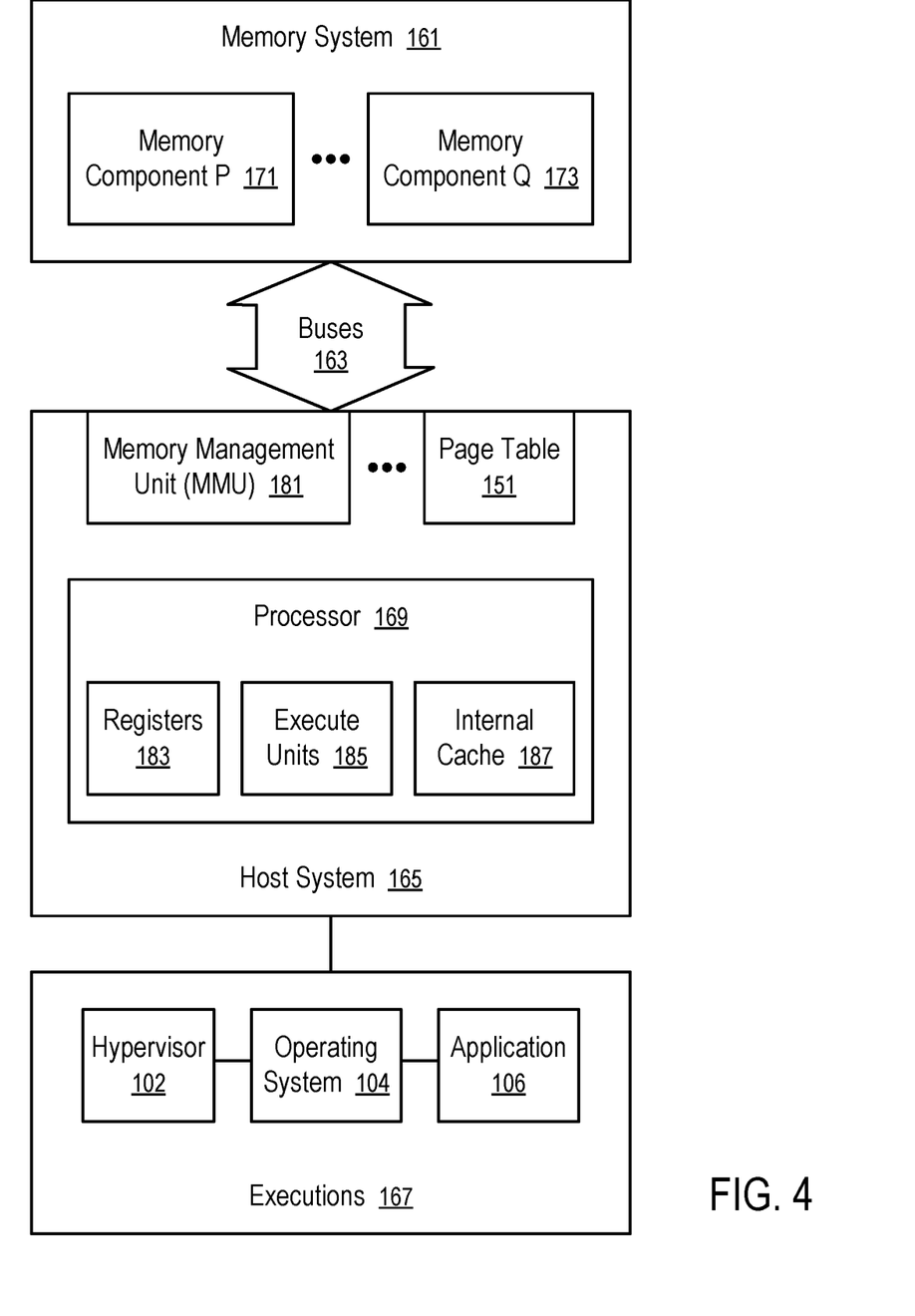
FIG. 4 shows a computer system having a page table to configure security operations.

FIG. 4 shows a computer system having a page table (e.g., 151) to configure security operations.

The computer system of FIG. 4 has a host system (165) coupled to a memory system (161) via one or more buses (163). The memory system (161) has memory components (171, ..., 173).

For example, the buses (163) can include a memory bus connecting to one or more memory modules and/or include a peripheral internet connecting to one or more storage devices. Some of the memory components (171, ..., 173) can provide random access; and the some of the memory components (171, ..., 173) can provide persistent storage capability. Some of the memory components (171, ..., 173) can be volatile in that when the power supply to the memory component is disconnected temporarily, the data stored in the memory component will be corrupted and/or erased. Some of the memory components (171, ..., 173) can be non-volatile in that the memory component is capable of retaining content stored therein for an extended period of time without power.

In general, a memory system (161) can also be referred to as a memory device. An example of a memory device is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components (171, ..., 173) can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the host system (165). Alternatively, or in combination, a memory component (171, ..., or 173) can include a type of volatile memory. In some instances, a memory component (171, ..., or 173) can include, but is not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a host system (165) can utilize a memory system (161) as physical memory (109) that includes one or more memory components (171, ..., 173). The host system (165) can load instructions from the memory system (161) for execution, provide data to be stored at the memory system (161), and request data to be retrieved from the memory system (161).

In FIG. 4, the host system (165) includes a memory management unit (MMU) (181) and a processor (169). The processor (169) has execution units (e.g., 185), such as an arithmetic-logic unit. The processor (169) has registers (183) to hold instructions for execution, data as operands of instructions, and/or results of instruction executions. The processor (169) can have an internal cache (187) as a proxy of a portion of the memory system (161).

In some instances, the host system (165) can include multiple processors (e.g., 169) integrated on a same silicon die as multiple processing cores of a central processing unit (CPU).

Routines programmed for executing in the processor (169) can be initially stored in the memory system (161). The routines can include instructions for a hypervisor (102), an operating system (104), and an application (106). The routines stored initially in the memory system (161) can be loaded to the internal cache (187) and/or the registers (183) for execution in the execution units (185).

The running instances of the routines form the executions (167) of the hypervisor (102), the operating system (104), and the application (106). In some instances, a hypervisor (102) is not used; and the operating system (104) controls the hardware components (e.g., the memory system (161), peripheral input/output devices, and/or network interface cards) without a hypervisor.

The executions (167) of the hypervisor (102), the operating system (104), and/or the application (106) access memory (123) (e.g., in memory components (171, . . . , 173)) using virtual memory addresses (e.g., 141) defined in one or more virtual memory spaces (e.g., 127). At least one page table (151) (e.g., as illustrated in the FIG. 3) is used to translate the virtual memory addresses (e.g., 141) used in the execution to the physical memory addresses (e.g., 159) of the memory components (e.g., 171, . . . , 173).

As illustrated in FIG. 1, the executions of the routines of hypervisor (102), the operating system (104), and the application (106) can be organized into a plurality of domains (101, 103, . . . , 105). For each of the execution domains (101, 103, . . . , 105) and a memory region (123) identified by a page table entry (153), the page table entry (153) identifies a sandboxing configuration (107) having sandbox settings (e.g., 111, 113, . . . , 115) for calling a routine (119) stored in the region (123).

The host system (165) can have a shadow stack structure of FIG. 2 to protect the callee content (261) of a called routine (119) loaded from the region (123) when the sandbox setting (e.g., 111, 113, . . . , or 115) in the page table entry (153) has a predefined value (e.g., 1) for the corresponding execution domain (e.g., 101, 103, . . . , or 105) of the caller.

Figure 5:
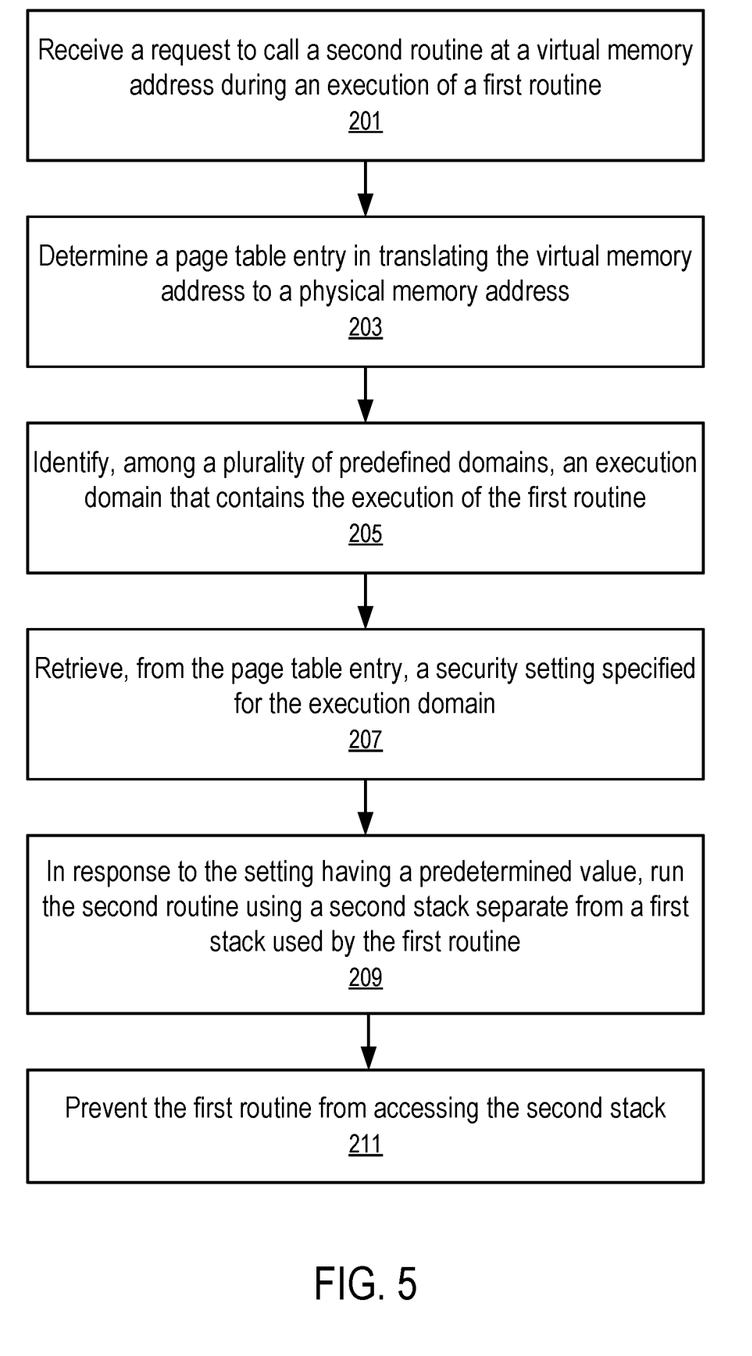
FIG. 5 shows a method to control shadow stack operations through settings specified in page table entries for execution domains.

FIG. 5 shows a method to control shadow stack operations through settings (e.g., 111, 113, . . . , 115) specified in page table entries (e.g., 153) for execution domains (101, 103, . . . , 105).

For example, the method of FIG. 5 can be performed in a computer system of FIG. 4, using a page table (151) of FIG. 3, to provide sandbox settings (111, 113, . . . , 115) of FIG. 2 for calls from routines in respective execution domains (101, 103, . . . , 105) illustrated in FIG. 1.

At block 201, a computer system (e.g., illustrated in FIG. 4) receives a request to call a second routine (119) at a virtual memory address (141) during an execution of a first routine.

For example, the first routine can be part of a hypervisor (102), an operating system (104), or an application (106). Thus, the execution of the first routine can be classified as in one of the set of predetermined domains (101, 103, . . . , 105) illustrated in FIG. 1.

At block 203, the memory management unit (MMU) (181) (or the processor (169) of the computer system) determines a page table entry (153) in translating the virtual memory address (141) to a physical memory address (159), as illustrated in FIG. 3.

At block 205, the memory management unit (MMU) (181) (or the processor (169) of the computer system) identifies, among a plurality of predefined domains (101, 103, . . . , 105), an execution domain (e.g., 101) that contains the execution of the first routine.

For example, memory addresses for loading the instructions of a routine can include an object identifier that determines the domain (e.g., 101, 103, . . . , 105) when the routine is loaded for execution in the processor (169). In other examples, the object identifier is part of the virtual address space and does not specify a domain. In some implementations, the page table entry (153) includes information identifying the domain of routines stored in the memory region (123) identified by the page table entry (153).

For example, a register (183) of the processor can store the identifier of the domain of a routine while the routine is being executed in the processor (169).

At block 207, the memory management unit (MMU) (181) (or the processor (169) of the computer system) retrieves, from the page table entry (153), a security setting (e.g., 111, 113, . . . , or 115) specified for the execution domain (e.g., 101, 103, . . . , or 105).

For example, the settings (111, 113, . . . , 115) of the sandboxing configuration (107) can be stored at a predetermined location in the page table entry (153).

At block 209, the computer system (e.g., illustrated in FIG. 4) runs the second routine (119) using a second stack (132) separate from a first stack (131) used by the first routine (e.g., in domain 101, 103, . . . , or 105), in response to the security setting (e.g., 111, 113, . . . , or 115) having a predetermined value (e.g., 1).

If the security setting (e.g., 111, 113, . . . , or 115) does not have the predetermined value (e.g., 1), the computer system (e.g., illustrated in FIG. 4) runs the second routine (119) using the same stack (131) used by the first routine.

At block 211, the hardware of the computer system (e.g., illustrated in FIG. 4) prevents the first routine (e.g., in domain 101, 103, . . . , or 105) from accessing the second stack (132).

For example, the sandbox setting bits (111, 113, . . . , 115) for the respective domains (101, 103, . . . , 105) can be stored at predetermined locations within the page table entry (153). Thus, based on the execution domain of the instructions, the memory management unit (MMU) (181) (or the processor (169) of the computer system) can extract a sandbox setting bit (e.g., 111, 113, . . . , or 115) and determine whether a sandboxing operation is to be invoked for the call to the called routine (119), according to the extracted sandbox setting bit.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A device, comprising:
    a memory;
    a processor coupled with the memory; and
    a page table having a page table entry, the page table entry configured to specify a plurality of security settings respectively for a plurality of domains of routines;
    wherein during execution of an instruction of a first routine in the processor to call a second routine at a virtual memory address, the device is configured to:
        determine, based on the page table entry, a physical memory address corresponding to the virtual memory address;
        identify a first domain of the first routine;
        select, based on the first domain of the first routine, a first security setting from the plurality of security settings specified in the page table entry for the plurality of domains respectively; and
        implement a security operation in the execution of the instruction to call the second routine based at least in part on the first security setting.

2. The device of claim 1, comprising:
    a memory management unit coupled between the processor and the memory and configured to map the virtual memory address to the physical memory address using the page table.

3. The device of claim 2, wherein the page table entry is configured to identify a base for a page of physical addresses; and the memory management unit is configured to combine the base and an offset specified in the virtual memory address to generate the physical address.

4. The device of claim 1, wherein the plurality of domains include a domain of routines of a hypervisor, a domain of routines of an operating system, or a domain of routines of applications, or any combination thereof.

5. The device of claim 1, further comprising:
    a first call stack allocated to execution of the first routine; and
    a second call stack;
    wherein the security operation in the execution of the instruction to call the second routine is configured, based on the first security setting having a value equal to a predetermined value, to allocate the second call stack to execution of the second routine.

6. The device of claim 5, wherein when the first call stack is allocated to the execution of the first routine, the device is configured to prevent the first routine from accessing the second call stack.

7. The device of claim 6, further comprising:
    a first set of registers configured to control operations of the first call stack; and
    a second set of registers configured to control operations of the second call stack.

8. The device of claim 7, wherein in the execution of the instruction of the first routine to call the second routine at the virtual memory address, the device is further configured to:
    copy, as part of the security operation identified according to the first security setting, at least a portion of content in the first call stack into the second call stack.

9. The device of claim 8, wherein the device is further configured to:
    erase, as part of the security operation identified according to the first security setting, the second call stack, in response to the execution of the second routine returning to the execution of the first routine.

10. A method, comprising:
    specifying, in a page table entry of a page table in a device, a plurality of settings for a plurality of domains of routines respectively;
    executing, by a processor in the device, an instruction of a first routine to call a second routine at a virtual memory address; and
    in response to the executing of the instruction:
        determining, based on the page table entry, a physical memory address corresponding to the virtual memory address;
        identifying a domain in which the first routine belongs;
        selecting, based on the domain in which the first routine belongs, a security setting from the plurality of settings specified in the page table entry for the plurality of domains respectively;
        identifying, based at least in part on the security setting specified for the domain in which the first routine belongs, a security operation; and
        performing the security operation in the executing of the instruction to call the second routine.

11. The method of claim 10, wherein the plurality of domains include a domain of routines configured in a hypervisor, a domain of routines configured in an operating system, or a domain of routines configured in applications, or any combination thereof.

12. The method of claim 10, further comprising:
    allocating a first call stack to execution of the first routine;
    wherein the security operation includes, based on the security setting having a value equal to a predetermined value, allocating a second call stack, separate from the first call stack, to execution of the second routine.

13. The method of claim 12, further comprising:
    preventing the first routine, having been allocated the first call stack for the execution of the first routine, from accessing the second call stack.

14. The method of claim 13, further comprising:
    controlling operations of the first call stack using a first set of registers; and
    controlling operations of the second call stack using a second set of registers separate from the first set of registers.

15. The method of claim 14, wherein the security operation further includes:
    copying content from the first call stack into the second call stack.

16. The method of claim 15, wherein the security operation further includes:
  erasing, upon returning from the execution of the second routine to the execution of the first routine, the second call stack.

17. An apparatus, comprising:
  at least one register;
  at least one execution unit; and
  a memory controller having a page table entry containing a plurality of settings specified for a plurality of domains respectively;
  wherein, in response to a first routine executed in the apparatus calling a second routine at a virtual memory address, the memory controller is configured to generate a physical memory address from the virtual memory address using the page table entry and use the physical memory address to load instructions of the second routine; and
  wherein the apparatus is further configured to perform a security operation identified by a security setting, among the plurality of settings, that is specified for a domain to which the first routine belongs.

18. The apparatus of claim 17, further comprising:
  a first stack; and
  a second stack separate from the first stack;
  wherein in response to execution of the first routine being assigned to use the first stack and the security setting having a predefined value, the apparatus is configured to assign execution of the second routine to use the second stack.

19. The apparatus of claim 18, wherein the apparatus is further configured to copy, as part of the security operation, content from the first stack into the second stack prior to execution of instructions of the second routine.

20. The apparatus of claim 18, wherein the apparatus is further configured to erase, as part of the security operation, the second stack upon execution of instructions returning from the second routine to the first routine.

* * * * *